(No Model.)
Z. L. CHADBOURNE.
PIPE EXPANDER.
No. 415,498. Patented Nov. 19, 1889.
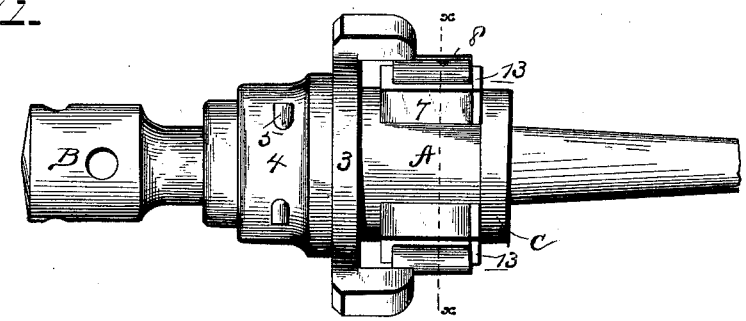
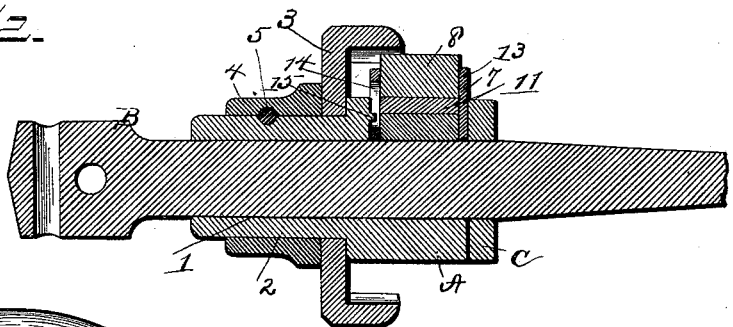
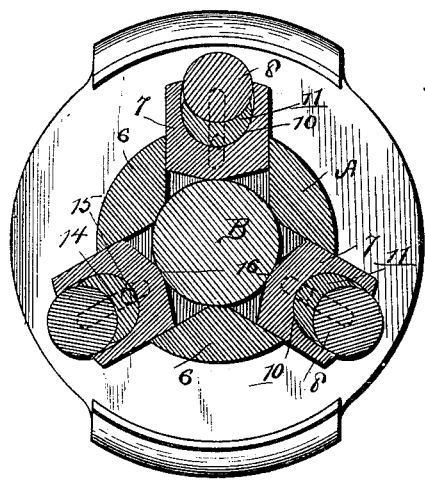
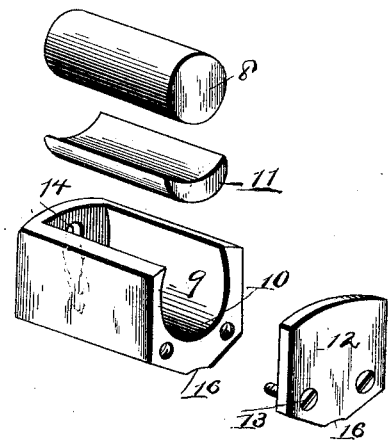
WITNESSES
F. L. Durand
R. W. Elliott
INVENTOR
Zebulon L. Chadbourne
by Sacus Bagger & Co,
Attorney

UNITED STATES PATENT OFFICE.

ZEBULON L. CHADBOURNE, OF BROOKLYN, NEW YORK, ASSIGNOR TO HOSEA NAPAY, OF SAME PLACE.

PIPE-EXPANDER.

SPECIFICATION forming part of Letters Patent No. 415,498, dated November 19, 1889.

Application filed February 23, 1889. Serial No. 300,896. (No model.)

*To all whom it may concern:*

Be it known that I, ZEBULON L. CHADBOURNE, a citizen of the United States, and a resident of Brooklyn, in the county of Kings and State of New York, have invented certain new and useful Improvements in Tube or Pipe Expanders; and I do hereby declare that the following is a full, clear, and exact description of the invention, which will enable others skilled in the art to which it appertains to make and use the same.

This invention relates to tube or pipe expanders.

The object is to produce a tube or pipe expander which shall be of such construction that it may be used for upsetting or expanding tubes or pipes of various sizes, and which may be constructed at a slight expense.

With these objects in view the invention consists in the novel construction and combination of parts of a tube or pipe expander, as will be hereinafter fully described in the specification, illustrated in the drawings, and pointed out in the claim.

In the accompanying drawings, forming part of this specification, and in which like letters and figures of reference indicate corresponding parts, I have illustrated one form of device embodying the essential features of my invention, although the same may be carried into effect in other ways without in the least departing from the spirit thereof, and in these drawings—

Figure 1 is a side elevation showing the device intact. Fig. 2 is a longitudinal sectional view of the same through one of the upsetting-dies. Fig. 3 is a transverse sectional view taken on the line *x x* of Fig. 1, and Fig. 4 is a detail perspective view of the bearing, showing the gib adapted to fit therein and the roller or upsetting-die designed to rest in the gib.

Referring to the drawings, A designates the head of the tube or pipe expander, provided with a central aperture 1, through which extends the mandrel B. The outer portion 2 of this head is reduced, as shown, and on this reduced portion fits the stop 3, against which the tube or pipe bears when the device is in operation, and a collar 4 for holding the said stop in place, which is done either by means of a bolt or a pin 5. The outer end of this head is cut away to leave three triangular-shaped arms or projections 6, between which work the bearings 7, in which are mounted the upsetting dies or rolls 8. This bearing is constructed with an open-ended recess 9, curved or rounded at its bottom, as shown at 10, and in this curved or rounded portion rests a crescent-shaped gib 11, which forms a bearing for the upsetting-dies 8. Upon the outer end of this bearing is a plate 12, designed to retain the roller and gib in place, the same being held securely in position by means of screws 13. The end of the bearing opposite to that upon which the plate is secured is provided with a slot 14, designed to engage a pin or projection 15, situated between the arms or projection 6, and prevent the bearing dropping out, while the bottom of the bearing, or that designed to come in contact with the mandrel, is provided with a curved recess or way 16, which is designed to conform to the periphery of the mandrel, so as to prevent undue friction by the said mandrel coming in contact with sharp edges.

C designates a collar designed to be secured to the outer ends of the arms or projections 6, to prevent the bearings falling out when the device is operated.

The method of operating this device is as follows: The head is first inserted within the tube, as with tube or pipe expanders of ordinary construction, and the mandrel B is then inserted from the outer end and turned by means of a wrench or pin in the usual manner, and the upsetting dies or rolls coming in contact with the inner surface of the tube or pipe forces the same out and secures it in place in the ordinary manner. If it is found, when the device is to be used, that the upsetting-rollers when at their lowest position will not allow the head to be inserted within the pipe, it is only necessary to remove the gib, when the rollers will drop a sufficient distance to admit of the said head being inserted, and if, when the bearings have been forced out to their full extent, it is found that the tube has not been expanded sufficiently it will be only necessary to insert the gib. In order to prevent the rollers falling out, the distance between the inner edges of the sides of the bearing is made less than the diameter of the roller. Thus the roller will be prevented falling out when the device is turned around. It will thus be seen that by constructing a tube or pipe expander in the manner herein described a simple and efficient device will be produced, and one which will permit of tubes or pipes of various sizes being upset, and that by constructing the bearing with a gib instead of having the roller bear directly upon the bearing, as in roller-tube expanders of ordinary construction, the device may be adapted to fit any size pipe that it may be desired to expand. Moreover, by means of the pins in the head and the slots in the bearings engaging the said pins, all possibility of the bearings working out and becoming lost is obviated.

Having thus fully described my invention, what I claim as new, and desire to secure by Letters Patent, is—

In a tube or pipe expander, the combination, with the head, of movable bearings mounted therein, a gib mounted in the bearings, and a roller in the gib, substantially as and for the purpose specified.

In testimony that I claim the foregoing as my own I have hereunto affixed my signature in presence of two witnesses.

ZEBULON L. CHADBOURNE.

Witnesses:
 AUGUST PETERSON,
 GEORGE A. WOOSTER.